(12) United States Patent
LoCascio et al.

(10) Patent No.: US 7,110,640 B2
(45) Date of Patent: Sep. 19, 2006

(54) RECONFIGURABLE OPTICAL ADD/DROP FILTER

(75) Inventors: Michael LoCascio, Albany, NY (US); Clinton T. Ballinger, Burnt Hills, NY (US); Daniel P. Landry, Clifton Park, NY (US); David Depoy, Clifton Park, NY (US)

(73) Assignee: Evident Technologies, Albany, NY (US)

( * ) Notice: Subject to any disclaimer, the term of this patent is extended or adjusted under 35 U.S.C. 154(b) by 0 days.

(21) Appl. No.: 09/907,932

(22) Filed: Jul. 19, 2001

(65) Prior Publication Data

US 2003/0016907 A1 Jan. 23, 2003

(51) Int. Cl.
*G02B 6/42* (2006.01)
(52) U.S. Cl. ..................................... 385/27
(58) Field of Classification Search ............ 385/27, 385/127, 37–47, 49, 15–24, 31–32, 8, 130, 385/11–22
See application file for complete search history.

(56) References Cited

U.S. PATENT DOCUMENTS

| | | | |
|---|---|---|---|
| 5,059,003 A | 10/1991 | Haus et al. | |
| 5,436,754 A | 7/1995 | Ishihara et al. | |
| 5,449,645 A | 9/1995 | Borrelli et al. | |
| 5,464,991 A | 11/1995 | Manabe et al. | |
| 5,474,591 A | 12/1995 | Wells et al. | |
| 5,505,928 A | 4/1996 | Alivisatos et al. | |
| 5,525,377 A | 6/1996 | Gallagher et al. | |
| 5,690,807 A | 11/1997 | Clark, Jr. et al. | |
| 5,705,321 A | 1/1998 | Brueck et al. | |
| 5,754,714 A * | 5/1998 | Suzuki et al. ................. 385/5 |
| 5,783,263 A | 7/1998 | Majetich et al. | |
| 5,822,095 A * | 10/1998 | Taga et al. ................. 359/127 |
| 5,887,089 A * | 3/1999 | Deacon et al. ............... 385/22 |
| 5,906,670 A | 5/1999 | Dobson et al. | |
| 6,057,561 A | 5/2000 | Kawasaki et al. | |
| 6,090,666 A | 7/2000 | Ueda et al. | |
| 6,106,609 A | 8/2000 | Yang et al. | |
| 6,126,740 A | 10/2000 | Schulz et al. | |
| 6,274,323 B1 | 8/2001 | Bruchez et al. ................. 435/6 |
| 6,411,752 B1 * | 6/2002 | Little et al. ................... 385/17 |
| 6,493,484 B1 * | 12/2002 | Garrett et al. ................ 385/27 |
| 2002/0167984 A1 * | 11/2002 | Scherer ....................... 372/50 |

OTHER PUBLICATIONS

G.C. Cho et al.; Electroabsorption Dynamics in an InGaAsP/InGaAsP Superlattice Modulator; OSA TOPS on Ultrafast Electronics and Optoelectronics, 1997, pp. 276-279, vol. 13, Optical Society of America.

P.T. Guerreiro et al.; Pbs quantum-dot doped glasses as saturable absorbers for mode locking of a Cr:forsterite laser; OpticalSciences Center, pp. 1595-1597, App. Phys. Lett. 71 (12), Sep. 22, 1997.

J. Mangeney et al.; Ultrafast saturable absorption at 1.55 um in heavy-ion-irradiated quantum-well vertical cavity; Applied Physics Letters; Mar. 13, 2000, vol. 76, No. 11, pp. 1271-1373.

(Continued)

*Primary Examiner*—J. F. Duverne
(74) *Attorney, Agent, or Firm*—Kenyon & Kenyon LLP

(57) ABSTRACT

An optical filter that includes a resonator cavity comprised of a saturable absorber material is provided. An input signal waveguide, a non-resonant wavelengths output waveguide, and a resonant wavelength output waveguide are coupled to the cavity. A refractive index of the saturable absorber material is altered so that a resonant wavelength output is directed down the resonant wavelength output waveguide and non-resonant wavelengths are directed down the non-resonant wavelengths output waveguide.

15 Claims, 8 Drawing Sheets

OTHER PUBLICATIONS

G. Tamulaitis et al.; Optical nonlinearities of glass doped with PbS nanocrystals; Journal Of Applied Physics, vol. 88, No. 1, Jul. 1, 2000, pp. 178-182.

K. Ogawa et al.; Femtosecond Reflectivity of InP/InGaAs Nonlinear Bragg Reflector; OSA TOPS on Ultrafast Electronics and Optoelectronics, 1997, vol. 13, pp. 272-275.

M. B. Yairi et al.; High-speed, optically controlled surfacce-normal optical switch based on diffusive conduction; Applied Physics Letters; vol. 75, No. 5, pp. 597-599.

M. Livingston et al.; Comparison of optical nonlinearities in piezoelectric strained [111]-and [001]-grown (In,Ga)As/(Ai,Ga)As quantum wells; Phys. Lett. 65 (22), Nov. 28, 1994; pp. 2771-2773.

Xiong Zhang et al.; Optical property of GaAsP/AoGaAs strained-layer quantum well grown on GaAs-(111)B substrate; pp. 186-188; Appl. Phys. Lett. 66 (2), Jan. 9, 1995.

Tomoyuki Akiyama et al.; Sub-pJ operation of broadband asymmetric Fabry-Perot all-optical gate with coupled cavity structure; pp. 1545-1547, Applied Physics Letters; vol. 72, No. 13, Mar. 30, 1998.

C. Knorr et al.; A mechanism for low-power all-optical switching in multiple-puantum-well structures; pp. 4212-4214; Appl. Phys. Lett. 69 (27), Dec. 30, 1996.

S. Janz et al.; Low threshold optical bistable in an asymmetric $\Lambda/4$ shifted distributed-feedback heterostructure; pp. 1051-1053; Appl. Phys. Lett. 67 (8), Aug. 21, 1995.

Tzong-Yow Tsai et al.; $CO^{2}+$:ZnS and $Co^{2}+$:ZnSe saturable absorber Q switches; Journal of Applied Physics, vol. 87, No. 1, pp. 25-29, Jan. 1, 2000.

Paul W. Juodawlkis et al.; Subpiosecond nonlinear absorption recovery dynamics of low-temperature-grown $In_{0.53}Ga_{0.47}As/In_{0.52}Al_{0.48}As$ multiple quantum well p-I-n structures; OSA TOPS on Ultrafast Electronics and Optoelectronics, 1997; pp. 284-289, vol. 13, Martin Nuss and John Bowers (ed.).

Arthur J. Nozik et al.; Colloidal Quantum Dots Of III-V Semiconductors; pp. 24-30, MRS Bulletin/Feb. 1998.

D. Bimberg et al. Growth, Spectroscopy, and Laser Application of Self-Ordered III-V Quantum Dots; pp. 31-42, MRS Bulletin/Feb. 1998.

Daniel Gammon; High-Resolution Spectroscopy of Individual Quantum Dots in Wells; pp. 44-48 MRS Bulletin/Feb. 1998.

Encai Hao et al.; Synthesis and Optical Properties of CdSe and CdSe/CdS Nanoparticles; Chem Mater. 1999, 11, 3096-3102.

Seigo Tarucha; Transport in Quantum Dots: Observation of Atom-like Properties; pp. 49-52, MRS Bulletin/Feb. 1998.

A.P. Alivisatos; Electrical Studies of Semiconductor-Nanocrystal Colloids; pp. 18-24, MRS Bulletin/Feb. 1998.

Alex Zunger; Semiconductor Quantum Dots; pp. 15-17, MRS Bulletin/Feb. 1998.

Gordan A. Thomas et al.; Physics In The Whirlwind Of Optical Communications; pp. 30-36, Sep. 2000 Physics Today.

* cited by examiner

US 7,110,640 B2

RECONFIGURABLE OPTICAL ADD/DROP FILTER

FIELD OF THE INVENTION

The present invention is directed to optical communications. More particularly, the present invention is directed to a reconfigurable optical add/drop filter for an optical network.

BACKGROUND INFORMATION

The enormous increase in data traffic, largely due to the growth in Internet traffic, has spurred rapid growth in broadband communication technologies. Fiber optics, which offers the largest bandwidth of any communication system, is the medium of choice for carrying the multitude of data now being sent through networks.

A method of increasing the amount of bandwidth in a fiber optic communication system is to transmit multiple streams of information-bearing data on different wavelengths in the same physical optical transmission system. This technique, referred to as Wavelength Division Multiplexing ("WDM"), uses many wavelength channels within the same fiber to simultaneously transmit information over many streams. Thus the total bandwidth of the fiber is increased by a factor given by the number of wavelengths being used.

There are several components that make WDM systems possible, including tunable narrow band lasers, wavelength multiplexors/demultiplexors, add/drop filters, wavelength converters, and tunable receivers. All of these components are wavelength channel specific, and are used to guide the information on specific channels from the source to the destination.

Add/drop filters in WDM systems can be placed in front of an incoherent receiver and used to select a particular signal from many arriving signals. Filters can also be used to control which path though a network a signal will take.

One type of device that can be used as a filter in a WDM system is a Fabry-Perot filter, also referred to as an "Etalon". A Fabry-Perot filter includes two highly reflective parallel mirrors that form a Fabry-Perot cavity. As input light is directed toward the first mirror; some of the light enters the cavity and some is reflected away. The light in the cavity is either transmitted through the second mirror or is reflected back toward the first mirror, which either leaves or is reflected again. Interference patterns are set up which cause the desired wavelength to be passed by the cavity but other wavelengths to destructively interfere and cancel. The desired wavelength is the resonant wavelength of the cavity.

Another known filter is a Fiber Bragg Grating ("FBG") filter. An FBG filter is a very simple, extremely low cost, wavelength selective filter. It has a wide range of applications that both improve the quality and reduce the cost of optical networking. An FBG is a piece of single mode fiber a few centimeters in length. The grating is constructed by varying the refractive index of the core lengthwise along the fiber. Light of the specified wavelength traveling along the fiber is reflected from the grating back in the direction from which it came. Wavelengths which are not selected are passed through with little or no attenuation.

Another known filter is a thin-film resonant cavity filter ("TFF"), or a Fabry-Perot interferometer, or Etalon, where the mirrors surrounding the cavity are realized by using multiple reflective dielectric thin-film layers. This device acts as a bandpass filter, passing through a particular wavelength and reflecting all the other wavelengths. The wavelength that is passed through is determined by the cavity length.

Another type of filter is a Mach-Zehnder interferometer ("MZI"), which is an interferometric device that makes use of two interfering paths of different lengths to resolve different wavelengths. Mach-Zehnder interferometers are typically constructed of integrated optics and consist of two 3-dB directional couplers interconnected through two paths of different lengths.

Still another type of filter is an arrayed waveguide grating ("AWG"), which uses the same principle as the Mach-Zender interferometer. An AWG consists of two multiple-input, multiple-output couplers that are connected together by an array of waveguides, each having different lengths. The AWG has multiple copies of the same signal shifted in phase by different amounts added together, while the MZI has only two.

In general, one problem with many of the above-described filters is a lack of tunability. Specifically, in many of the above-described filters the wavelength channels that are selected for transmission must be selected during manufacturing and cannot be changed or tuned when placed in a network. Many of these filters also suffer from being large in size and therefore difficult to implement.

Based on the foregoing, there is a need for an improved optical add/drop filter that can be used in a WDM system.

SUMMARY OF THE INVENTION

One embodiment of the present invention is an optical filter that includes a resonator cavity comprised of a saturable absorber material. An input signal waveguide, a non-resonant wavelengths output waveguide, and a resonant wavelength output waveguide are coupled to the cavity.

BRIEF DESCRIPTION OF THE DRAWINGS

FIGS. 8a–c are graphs illustrating results using Lead Sulphide quantum dots.

DETAILED DESCRIPTION

One embodiment of the present invention is a reconfigurable add/drop filter that incorporates a saturable absorber material into a micro-cavity resonator device. In one embodiment, the filter consists of a Quantum dot saturable absorber material implemented into a micro-resonant cavity that can either take a Fabry-Perot vertical stack or Ring resonator form. The filter is designed as a passband filter that either transmits a single wavelength channel, with either 200, 100 or 50 Ghz channel spacing, while reflecting all other wavelength channels, or vice-versa, by altering the resonant condition of the micro-cavity resonator through an optically induced change in refractive index of the Quantum dot material. The refractive index change occurs through illuminating the Quantum dot material with an intense light beam which reduces the absorption coefficient.

Figure 1:
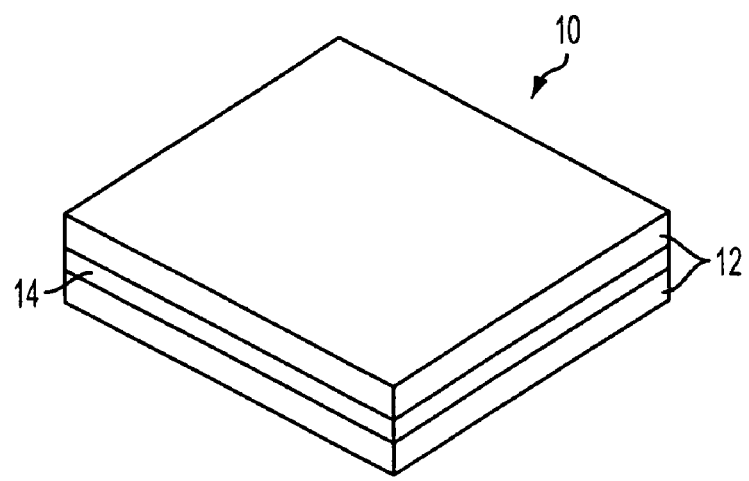
FIG. 1 is a perspective diagram of a Fabry-Perot vertical stack used in a filter in accordance with one embodiment of the present invention.

FIG. 1 is a perspective diagram of a Fabry-Perot vertical stack 10 used in a filter in accordance with one embodiment of the present invention. Fabry-Perot vertical stack 10 includes a Quantum dot doped saturable absorber thin film 14 sandwiched between two planar mirrors 12. Mirrors 12 can be reflective thin metallic films having a high reflectivity but less than 1. Mirrors 12 can also consist of a dielectric thin film stack that is designed to be reflective at the desired wavelength region, again with a high reflectivity but less than 1.

A Fabry-Perot resonant cavity formed in Fabry-Perot vertical stack 10 allows for a specific wavelength channel to be transmitted through the device while reflecting all others at the same time within a designed wavelength region (e.g., the 1530–1560 nm telecommunication region). The transmitted wavelength is a function of the refractive index and thickness of Quantum dot saturable absorber material 14 within the cavity. By changing the refractive index of the Quantum dot cavity material, the device can selectively transmit a desired wavelength. The refractive index can be changed by Illuminating the saturable absorber material with a high intensity optical beam. The beam reduces the absorption coefficient of the saturable absorber material and subsequently alters the refractive index of the material through the known Kramers-Kronig relation, thereby changing the resonant condition of the device.

Figure 2:
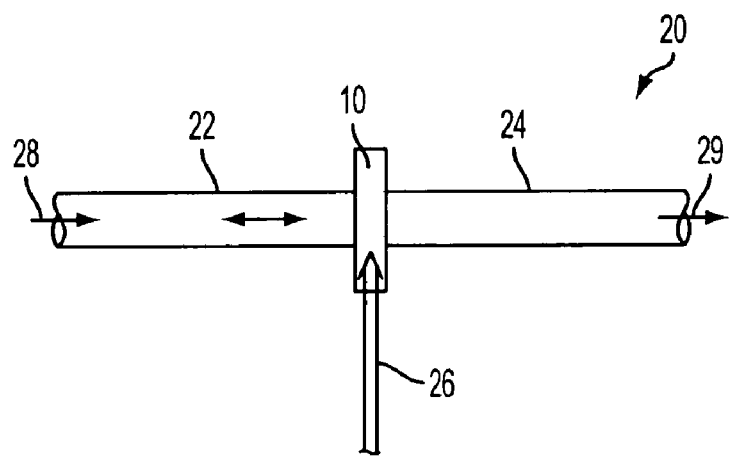
FIG. 2 is a block diagram of a Fabry-Perot add/drop filter in accordance with one embodiment of the present invention.

FIG. 2 is a block diagram of a Fabry-Perot add/drop filter 20 in accordance with one embodiment of the present invention. Filter 20 includes a Fabry-Perot vertical stack 10 such as described above in conjunction with FIG. 1. An input optical fiber 22 carries a input optical signal 28 that consists of a dense WDM ("DWDM") stream of multiple wavelength channels. Signal 28 is directed towards the front surface of Fabry-Perot stack 10. The wavelength that is resonant with Fabry-Perot vertical stack 10 is transmitted through to an output optical fiber 24, while the other wavelength channels are reflected back off the front surface.

Figure 3:
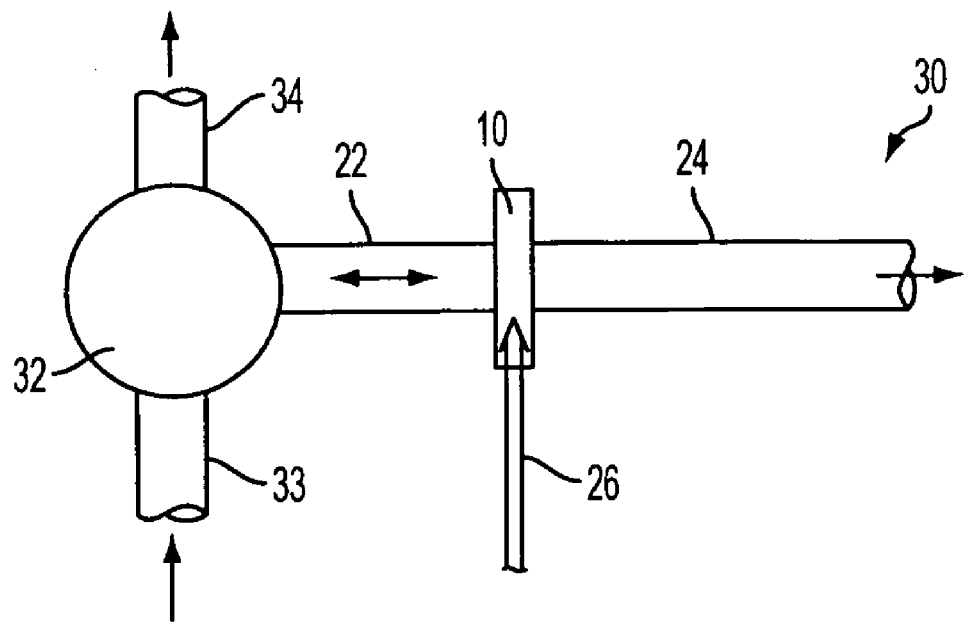
FIG. 3 is a block diagram of a Fabry-Perot add/drop filter in accordance with another embodiment of the present invention.

In filter 20, input optical fiber 22 is perpendicular to the front surface of Fabry-Perot vertical stack 10 and the reflected wavelength channels are reflected back into the fiber. FIG. 3 is a block diagram of a Fabry-Perot add/drop filter 30 in accordance with another embodiment of the present invention. In filter 30, the reflected wavelength channels are separated from the input wavelength channels with an optical circulator Input optical fiber 33 carries the input signals and non-resonant output fiber 34 carries the reflected signals.

Figure 4:
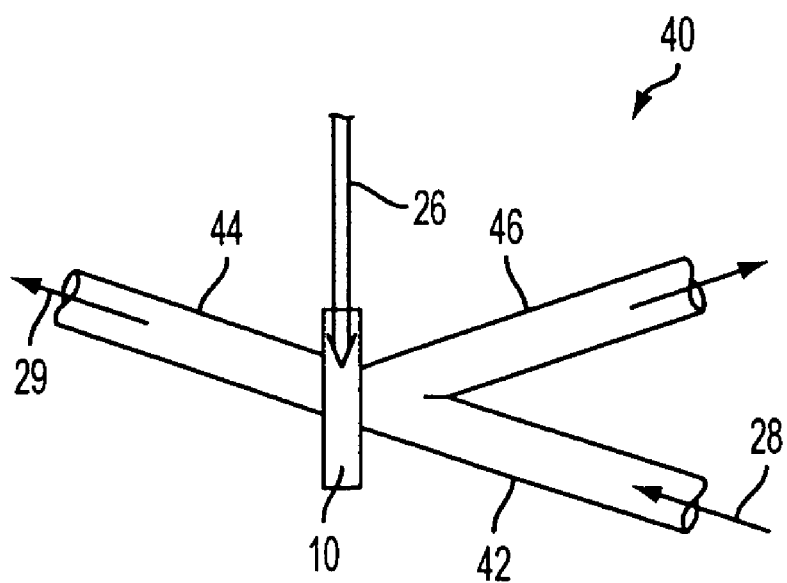
FIG. 4 is a block diagram of a Fabry-Perot add/drop filter in accordance with another embodiment of the present invention.

FIG. 4 is a block diagram of a Fabry-Perot add/drop filter 40 in accordance with another embodiment of the present invention. In filter 40, the input optical fiber 42 is not perpendicular to the front surface of Fabry-Perot vertical stack 10. The reflected wavelength channels can then be directed to another optical fiber 46 while the transmitted resonant channel is transmitted on optical fiber 29.

Figure 5:
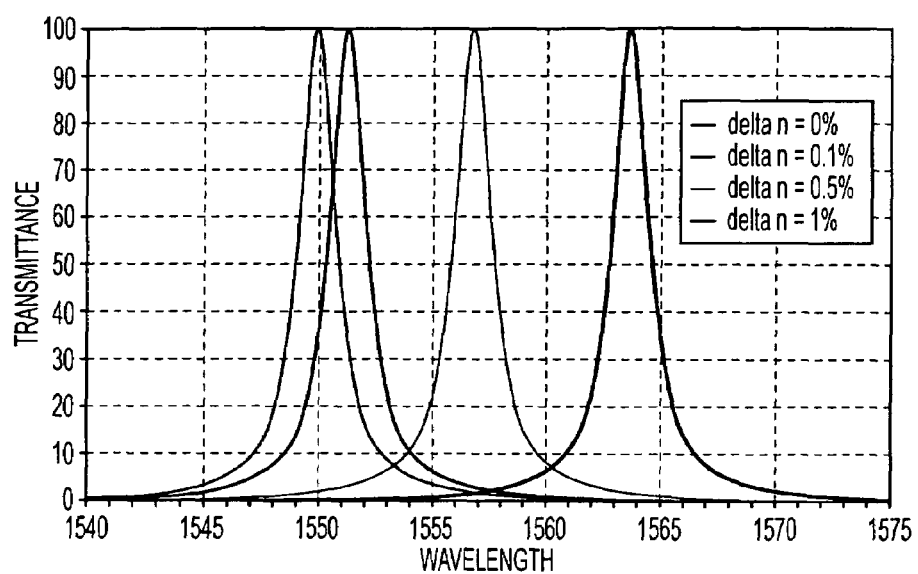
FIG. 5 is a graph illustrating the transmission versus wavelength for a vertical stack Fabry-Perot filter in accordance with one embodiment of the present invention.

FIG. 5 is a graph illustrating the transmission versus wavelength for a vertical stack Fabry-Perot filter in accordance with one embodiment of the present invention with the following characteristics:

19 layers (9 reflector layers+1 cavity layer+9 reflector layers).

HLHLHLHLHQHLHLHLHLH design where:
- H refers to a single layer of high index of refraction material with optical thickness (physical thickness× index of refraction) equal to ¼ of the design wavelength, $\lambda_{des}$=1550 nm.
- L refers to a single layer of low index of refraction material with optical thickness equal to ¼ of the design wavelength, $\lambda_{des}$.
- Q refers to the cavity layer and is formed using quantum dot saturable absorber material with variable index of refraction (i.e. the index of refraction can be changed by illuminating the quantum dot material with an optical control beam of appropriate intensity).

high index of refraction material with $n_H$=2.2.
low index of refraction material with $n_L$=1.45.
cavity layer index of refraction, $n_Q = n_{Q,unpumped}*(1+\Delta n)$
$n_{Q,unpumped}$=1.45 is the index of refraction of the quantum dot saturable absorber material under no illumination (i.e., not pumped).

The physical thickness of the quantum dot cavity layer is equal to $30*\lambda_{des}/(4*n_{Q,unpumped})$ As shown in FIG. 5, the peak transmission of the filter occurs at 1550 nm for the unpumped condition (delta n=0%). The wavelength of peak transmission for a Fabry-Perot filter is a strong function of the index of refraction of the cavity layer. Therefore, as shown in FIG. 5, as the index of refraction of the quantum dot saturable absorber resonant cavity layer is increased, the transmission peak shifts to longer wavelengths.

Thus, for this example, an increase of the index of refraction of the quantum dot material of only 0.5% causes a shift in the peak transmission from 1550 nm to 1557.5 nm, thus demonstrating selective transmission of the desired wavelengths.

The absorption of light in a saturable absorber material, such as saturable absorber material 14 of FIG. 1, occurs when a photon excites an electron from one quantum state to a higher one. As the upper states become filled, fewer transitions from the lower state into the higher one can occur and the material becomes more transparent (saturates). The saturation level (the change in transparency) depends on the intensity of incoming light (number of photons per unit time) because eventually the electrons in upper levels relax back to the lower levels. The net result is the optical properties of the material (transparent or opaque) depend on the intensity of the incident light.

In general, a saturable absorber ("SA") such as SA material 14 is a material that displays a reduction in the absorption coefficient at the operational wavelength with increased incident light intensity. The behavior of such a material can be modeled as a two state system, i.e., a system possessing two quantum states of different energies that an electron can exist in. In the natural state of the material, one in which no light is incident upon the material, all electrons lie in the lower energy state. An incident photon having a wavelength (hence energy) that corresponds to the energy difference between the quantum states will be absorbed if it excites an electron from the lower energy level to the upper energy level.

An electron in the upper state will drop back to the lower energy level in one of two ways. It can: (1) spontaneously drop back and release energy as heat (referred to as "non-radiative recombination") or as a photon of the same wavelength that originally excited it (referred to as "spontaneous radiative recombination" or "spontaneous emission"); or (2) interact with another photon, having the wavelength corresponding to the energy difference between quantum states, that forces the electron down to the lower energy level by the release of two photons (referred to as "spontaneous emission"). The average time the electron remains in the upper level (assuming the drop from the upper state to the lower state is by spontaneous recombination) is given by the relaxation constant ($\tau$).

At low light intensities there is a much higher probability of an electron being excited to an upper energy level than an electron being forced down to the lower energy level because at low light intensities very few electrons exist in the upper state. At higher light intensities a higher fraction of the electrons build up in the upper state. Because more electrons exist in the upper state there is a larger probability of an electron being forced to a lower energy level. At the limit (extremely high light intensities) an equal number of electrons exist in the upper state as in the lower state. At this point there is an equal probability of an electron in the lower energy levels jumping to the upper energy level (absorbing a photon) as an electron in the upper energy level interacting with a photon and dropping to the lower energy level releasing two photons. If both processes are considered there is no net reduction of the number of photons. Hence, the absorption falls to zero.

A saturable absorber such as SA material 14 differs from, for example, a non-linear material. As discussed, a saturable absorber involves the transitions of electrons between quantum states. In contrast, non-linear materials, instead of relying on transitions, involve the non-linear reaction due to the electric field of the photons at high photon fluxes (i.e., high light intensity). This reaction is called the electric polarization (P). Because a saturable absorber requires a transition between states, it is highly selective as to which wavelength it can operate in (i.e., only wavelengths that correspond to an electronic transition can saturate a saturable absorber).

Figure 6:
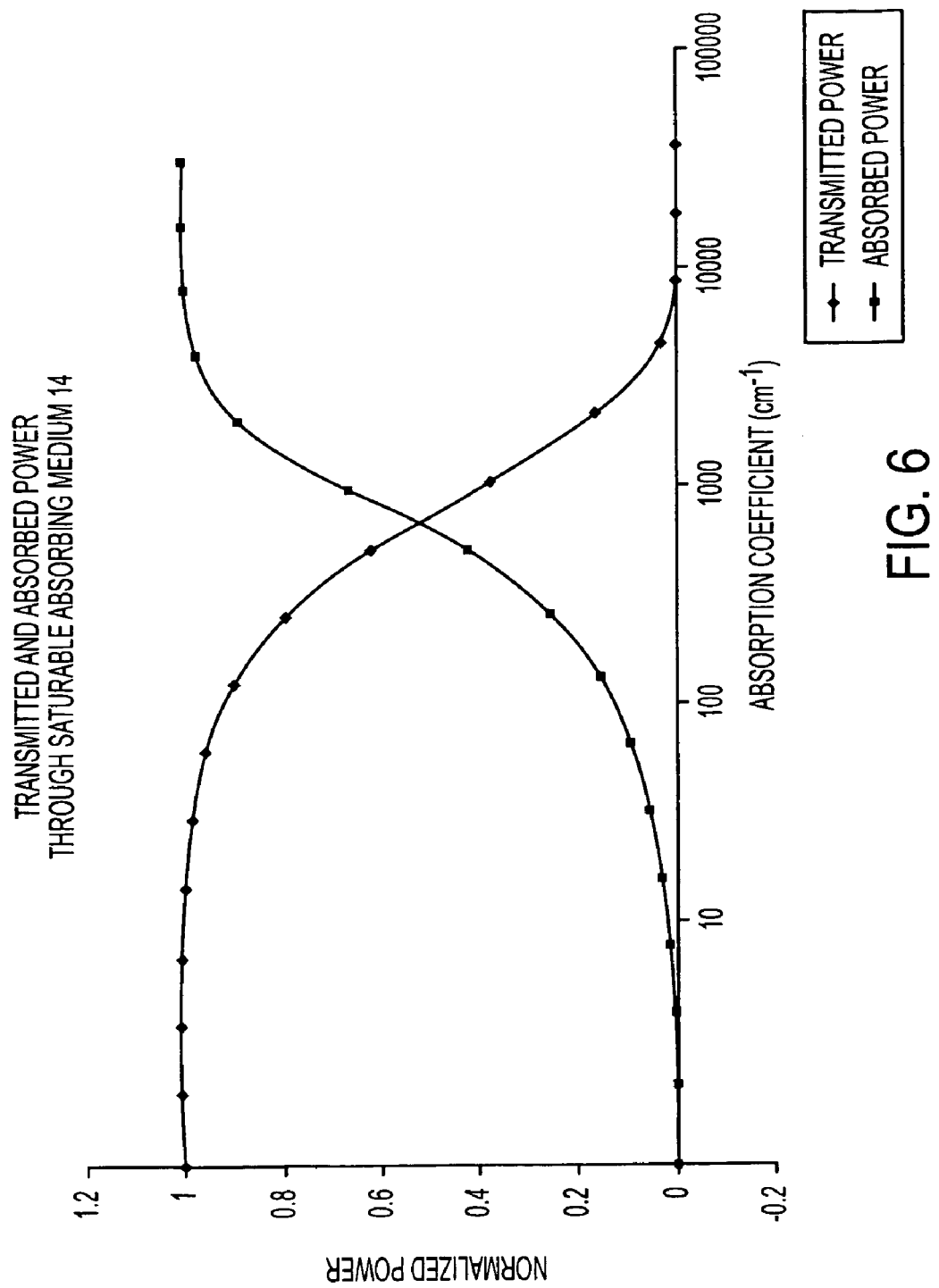
FIG. 6 is a graph illustrating the normalized power vs. the absorption coefficient of one embodiment of the SA material.

The applicable equation for determining the absorption requirements for SA material 14 is as follows:

$$I_{out} = I_{in} e^{-\alpha d}$$

where $\alpha$ is the absorption coefficient and d is the length of SA material 14. In an embodiment where SA material 14 has a length of 10 microns, an absorption coefficient of approximately 4700 cm$^{-1}$ is required for the "off" state (0.9% transmitting) and 100 cm$^{-1}$ for the "on" state (90% transmitting). FIG. 6 is a graph illustrating the normalized power vs. the absorption coefficient of one embodiment of SA material 14.

One embodiment of SA material 14 of FIG. 1 is a composite material containing semiconductor nanocrystals (referred to as "quantum dots") contained in a glass or silicon matrix. Quantum dots interspersed within a matrix material offer an opportunity for an ideal saturable absorber for multiple reasons. For one, the quantum states of the quantum dots can be engineered to correspond to any wavelength simply by altering their size. Further, the density of quantum states (i.e., the number of electrons per unit volume that are able to jump from one quantum state to another) are much lower than in bulk semiconductor materials. Therefore, a lower intensity incident light beam is required for it to saturate. Further, quantum dots eliminate slower excitations that occur at high light intensities such as a two photon absorption that exists in bulk semiconductors. Therefore, the use of quantum dots enables a fast, low power (low intensity), and tunable saturable absorber.

In one embodiment, the quantum dots are comprised of Lead Sulfide (PbS) or Lead Selenide and are approximately 5 nanometers in diameter. In a further embodiment, the quantum dots are 5.7 nanometers in diameter. This size of the dots results in a large change of absorption with intensity while maintaining fast switching speed. The intensity of light required to saturate SA material 14 depends on the size and composition of the dots, as characterized by the optical cross section of SA material 14. The concentration of dots determines how thick a slab of material (quantum dots in glass) is required to produce a given change in intensity of the signal. In one embodiment, a thickness of 0.1 cm is required to arrive at a 20 dB signal change (assuming 50% saturation). Increasing the dot density allows the same change with a thinner device. The absorption length ($\alpha_0^{-1}$) is related to the optical cross section ($\sigma_0$) and the number density (dots per volume) of dots $N_d$ by:

$$\alpha_0 = N_d \sigma_0$$

A limitation exists to the concentration of dots within the matrix material because it is not possible to pack dots any closer than when they are touching. The densest packing configuration is the face-centered cubic ("FCC") lattice which has a packing density of 0.7.

In one embodiment, the quantum dots are produced in a glass matrix. The glass matrix material is beneficial for two reasons: (1) it is transparent to the light which is to be absorbed by the dots thus allowing the output signal to be transmitted when filter 20 is in the "on" mode; and (2) the glass, having a much larger band gap than the quantum dot material, acts to confine the electron-hole pairs. This quantum confinement allows the requisite absorption spectrum to be obtained. In other embodiments, the matrix material is a plastic, or a semiconductor that is transparent to the operational wavelengths. Other possible matrix materials include Silicate, Borosilicate, and Phosphosilicate glasses, Polymethyl methacrylate (PMMA), Acrylic, polyamine polymers, and semiconductors including Silicon, Silicon Carbide, Cadmium Sulphide, Cadmiun Selenide, Cadmium Telluride, Zinc Sulphide, Aluminum Arsenide, Aluminum Phosphide, Gallium Arsenide.

In one embodiment, cladding is added to the quantum dots. The purpose of the cladding is to greatly increase the optical cross-section of the core semiconductor quantum dot, thus decreasing the optical power required for saturation as well as decreasing the relaxation time. An electrically conducting cladding material (like a metal) locally increases the light intensity within the core semiconductor, thus enhancing the absorption cross section. A semiconductor cladding material acts as a surface passivating agent and reduces the number of trapped states, which increases the absorption cross section.

The band-gap energy of the cladding material is wider than the band-gap of the core semiconductor. In one embodiment, SA material 14 has an operational wavelength of 1500 nm (0.827 eV). In this embodiment, suitable semiconductor cladding materials include Silicon (Si), Silicon Carbide (SiC), Cadmium Sulfide (CdS), Cadmium Selenide (CdSe), Zinc Sulfide (ZnS), Zinc Selenide (ZnSe), Zinc Telluride (ZnTe), AlAs, AlP, AlSb, GaAs and InP. In addition, other materials that include metals such as Ag, Au and Al are appropriate for use as cladding materials.

The thickness of the cladding coating determines the enhancement of the absorption coefficient of the quantum dot material. The parameter describing the coating thickness is the ratio of the core radius to the shell radius ("arat"). Typical values of arat are between 0.7 and 0.85. Thus for core radii between 2.5 nm and 5.0 nm (appropriate for PbS), a shell thickness between 0.5 nm and 2.5 nm gives the desired enhancement. In one embodiment, the quantum dots are manufactured using a thermal precipitation process that involves dissolving some amount of semiconductor material in a molten glass. The melt is controllably cooled until the quantum dots begin to precipitate out in the form of nano-crystals. A method for manufacturing quantum dots using a thermal precipitation process is disclosed in, for example, P. T. Guerreiro et al., "PbS Quantum-Dot Doped Glasses as Saturable Absorbers for Mode Locking of a Cr:Forsterite Laser", Appl. Phys. Lett. 71 (12), Sep. 22, 1997 at 1595.

In another embodiment, SA material 14 is manufactured using a colloidal growth process that involves growing nano-crystal quantum dots in a solution. Specifically, semiconductor precursors are introduced into a heated surfactant solution. The precursors crack in the solution and the semiconductors combine to form the nano-crystals. The quantum dots can then be removed from the solution and combined with a powdered glass solution. The powdered glass, referred to as a "sol-gel" can be shaped into a variety of forms. The sol-gel can be sintered into a large block, drawn and sintered into a fiber, or spun on a substrate and sintered to form a thin film. A method for manufacturing quantum dots using a colloidal growth process is disclosed in, for example: (1) U.S. Pat. No. 5,505,928, entitled "Preparation of III–V Semiconductor Nanocrystals"; (2) Nozik et al., "Colloidal Quantum Dots of III–V Semiconductors", MRS Bulletin, February 1998 at 24; and (3) Hao et al., "Synthesis and Optical Properties of CdSe and CdSe/CdS Nanoparticles", Chem. Mater. 1999, 11 at 3096.

Dispersion and absorption in a material such as SA material 14 are closely related. A dispersive material with wavelength-dependent refractive index must also be absorptive and the absorption coefficient must be wavelength dependent. This relation between the absorption coefficient and the refractive index has its origin in underlying relations between the real and imaginary parts of the susceptibility, $\chi'(\nu)$ and $\chi''(\nu)$, called the "Kramers-Kronig" relations:

$$\chi'(\nu) = \frac{2}{\pi} \int_0^\infty \frac{s\chi''(s)}{s^2 - \nu^2} ds$$

$$\chi''(\nu) = \frac{2}{\pi} \int_0^\infty \frac{\nu\chi'(s)}{\nu^2 - s^2} ds$$

These relations permit the determination of either the real or the imaginary component of the susceptibility. If one is known for all $\nu$, the other may be determined. The dielectric medium is characterized by its response to monochromatic fields. For a material with a resonance at frequency $\nu_0$ and resonance width of $\Delta\nu$ the frequency dependent susceptibility is given by $$\chi(\nu) = \chi_0 \frac{\nu_0^2}{\nu_0^2 - \nu^2 + j\nu\Delta\nu},$$

The real and imaginary parts of $\chi(\nu)$ are given by $$\chi'(\nu) = \chi_0 \frac{\nu_0^2(\nu_0^2 - \nu^2)}{(\nu_0^2 - \nu^2)^2 + (\nu\Delta\nu)^2}$$

-continued $$\chi''(\nu) = -\chi_0 \frac{\nu_0^2 \nu \Delta\nu}{(\nu_0^2 - \nu^2)^2 + (\nu\Delta\nu)^2}$$

If the resonant particle (e.g., the semiconductor quantum dots of SA material 14) are placed in a host medium of refractive index $n_0$, and if they are sufficiently dilute so that $\chi'(\nu)$ and $\chi''(\nu)$ are small, the overall absorption coefficient and refractive index are $$n(\nu) \approx n_0 + \frac{\chi'(\nu)}{2n_0}$$

$$\alpha(\nu) \approx -\left(\frac{2\pi\nu}{n_0 c_0}\right)\chi''(\nu)$$

Figure 7:
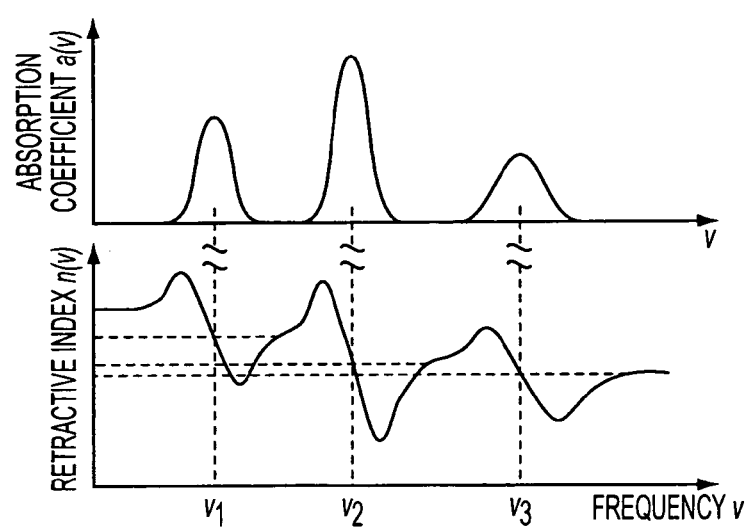
FIG. 7 is multiple graphs illustrating the absorption coefficient and refractive index of a medium with three resonances.

A typical dielectric medium contains multiple resonances, corresponding to different lattice and electronic vibrations. The overall susceptibility is the sum of contributions from these resonances. Whereas the imaginary part of the susceptibility is 5 confined near the resonance frequency, the real contributes at all frequencies near and below resonance. This is exhibited in the frequency dependence of the absorption coefficient and the refractive index. FIG. 7 is multiple graphs illustrating the absorption coefficient and refractive index of a medium with three resonances. As shown in FIG. 7, absorption and dispersion are strongest near the resonance frequencies. Away from it the resonance frequencies, the refractive index is constant and the medium is approximately nondispersive and nonabsorptive. Each resonance contributes a constant value to the refractive index at all frequencies smaller than its resonance frequency.

Figure 8A:
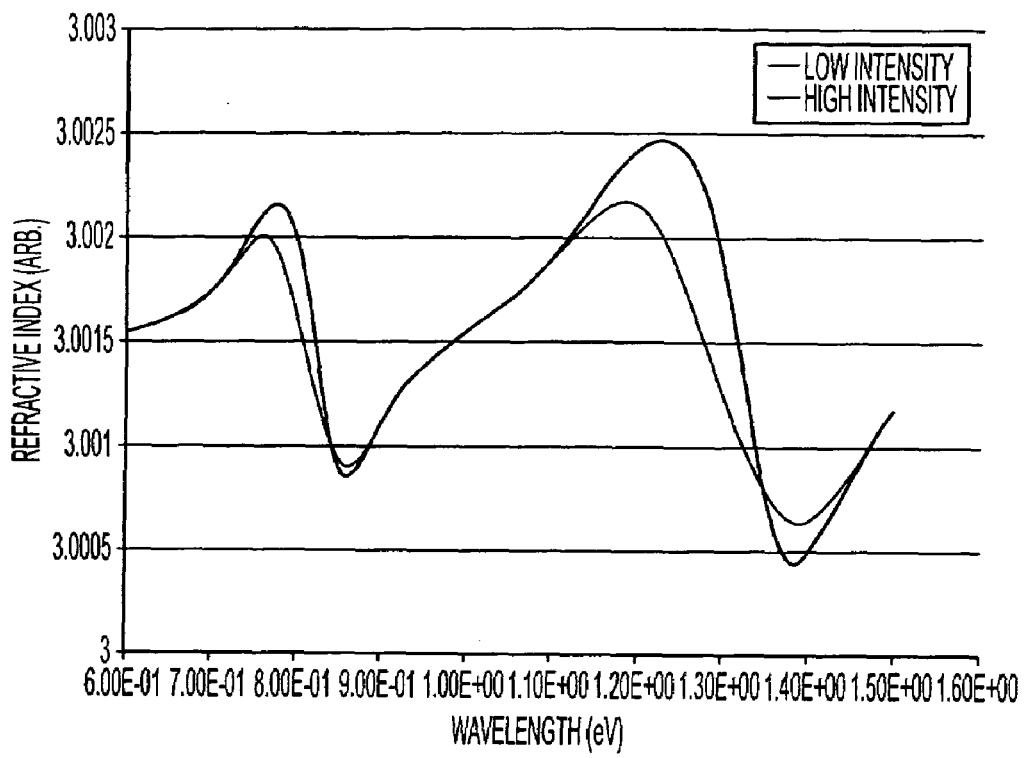
Figure 8B:
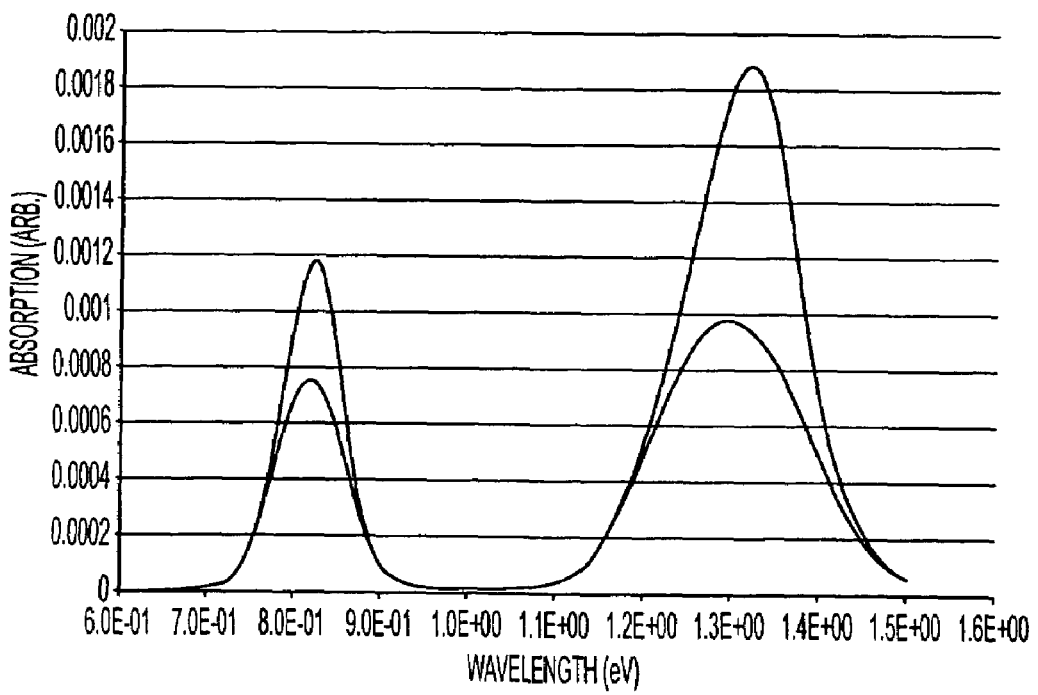

FIGS. 8a–c are graphs illustrating results using Lead Sulphide quantum dots. FIG. 8a shows the index of refraction for two intensities. FIG. 8b shows the associated absorption coefficient for the same two intensities. FIG. 8c shows the change in refractive index of the PbS quantum dots as a function of intensity at 1550 nm.

Figure 9:
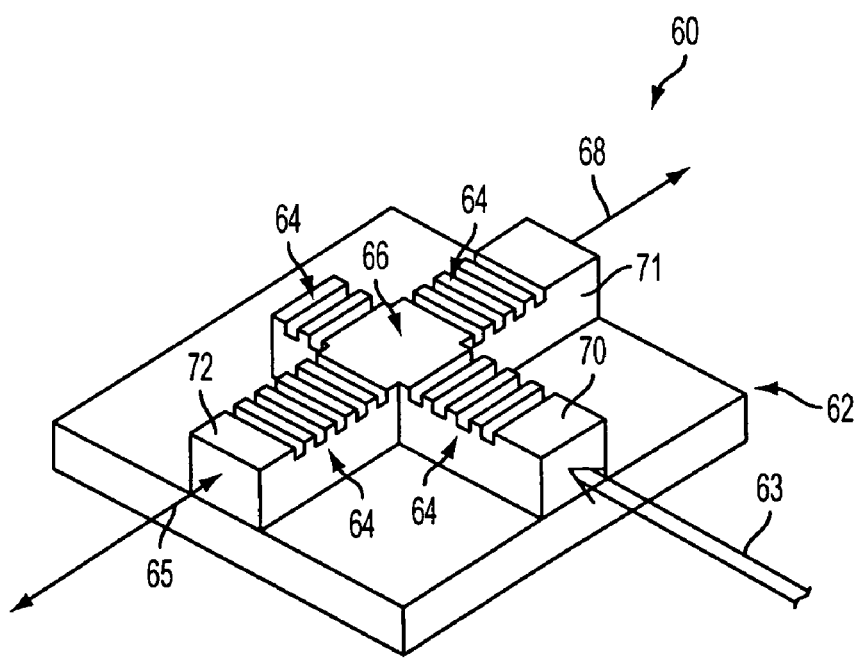
FIG. 9 is a Fabry-Perot resonator filter in accordance with another embodiment of the present invention.

FIG. 9 is a Fabry-Perot resonator filter 60 in accordance with another embodiment of the present invention. Filter 60 is formed on a substrate 62 using conventional microfabrication techniques. Filter 60 includes a cavity 66 made of an etched thin film of Quantum doped material designed to have a length d. Integrated waveguides 70–72 are coupled to cavity 66. Distributed Bragg mirrors 64, which are a periodic series of formed ridges, are etched into waveguides 70–72 and form the mirrors of the Fabry-Perot device. Distributed Bragg mirrors are structures that reflect light only when the grating period Λ satisfies the equation Λ=qλ/2, where q is an integer and λ is the wavelength of light in the medium.

A control optical beam 63 is coupled to cavity 66 via an optical fiber that is perpendicular to the plane of substrate 62. A signal input 65, which consists of a DWDM stream containing multiple wavelengths, is coupled to single-mode integrated waveguide 72 via an optical fiber. The selected wavelength channel (i.e., the wavelength channel that satisfies the Fabry-Perot resonant condition) is transmitted through cavity 66 and into a single-mode output waveguide 71, which in turn can be coupled into an output optical fiber. The other wavelength channels that are not resonant with Fabry-Perot device 60 are reflected back into the input optical fiber. The reflected wavelength channels may be separated from the input wavelength channels with an optical circulator.

Figure 10:
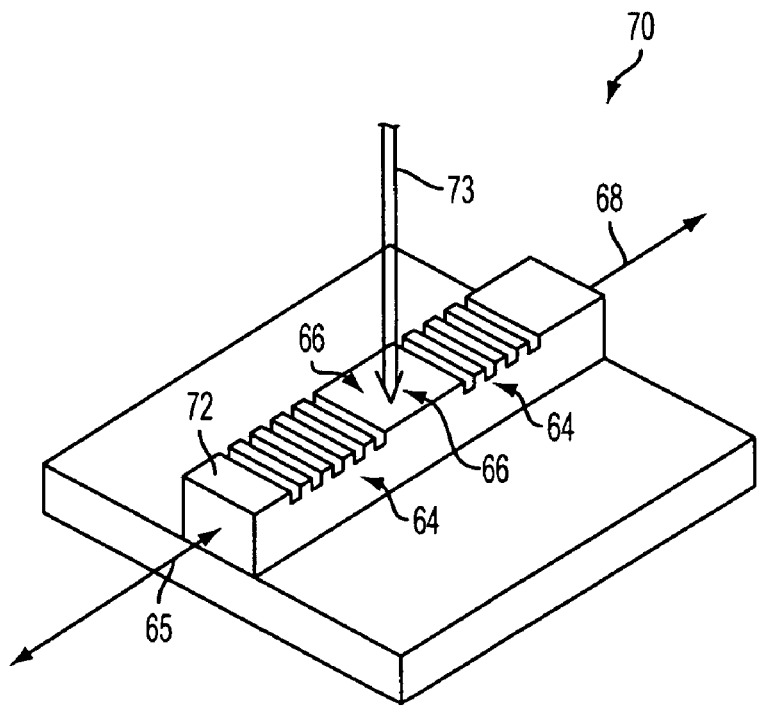
FIG. 10 is a Fabry-Perot resonator filter in accordance with another embodiment of the present invention.

FIG. 10 is a Fabry-Perot resonator filter 70 in accordance with another embodiment of the present invention. In filter 70, control optical beam 73 is coupled to cavity 66 via an optical fiber that is perpendicular to the plane of substrate 62.

In other embodiments, another set of dielectric thin film mirrors can be used to form another cavity in the vertical direction that increases the intensity of the control beam within the Quantum dot saturable absorber material. The control beam can also be delivered to the active region via an integrated waveguide in the plane of the substrate but perpendicular to the signal waveguides. Again, distributed Bragg mirrors could bound the Fabry-Perot cavity in the lateral direction in order to increase the intensity of the control optical beam within the cavity.

Waveguides 70–72 may be made of dielectric glass, polymer, or high bandgap semiconductor optical fiber (semiconductor with a bandgap greater than that of the operational wavelength making it transparent) or ridge, buried or photonic crystal based waveguides composed of glass, polymers, or high bandgap semiconductors.

Figure 11:
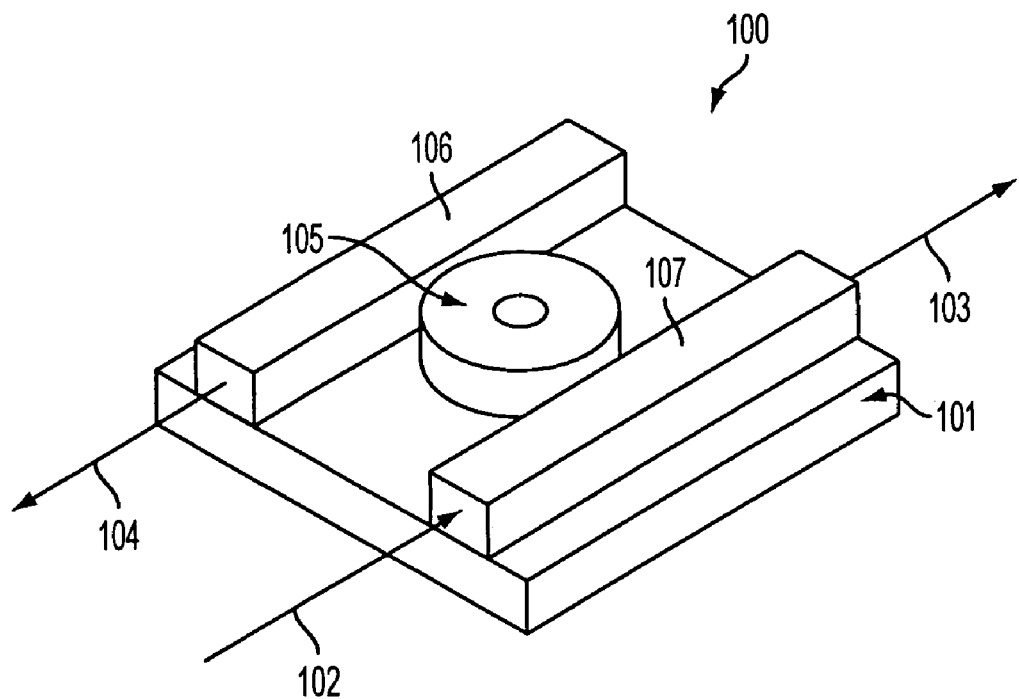
FIG. 11 is a ring resonator filter in accordance of another embodiment of the present invention.

FIG. 11 is a ring resonator filter 100 in accordance of another embodiment of the present invention. Filter 100 includes a ring resonator 105 evanescently coupled to two waveguides 106 and 107 located on opposite sides of resonator 105. Waveguide 107 is designated the input and throughput port, and waveguide 106 is the drop port. A multiple wavelength input signal 102 enters waveguide 107, the non-resonant wavelength signal 103 exits waveguide 107, and the resonant waveguide signal 104 exits waveguide 106. The coupling coefficient and thus the bandwidth are determined by the spacing between waveguides 106 and 107 and ring resonator 105.

Because the ring resonator and the waveguides are in the same plane, the coupling distance can be made using conventional lithography and etch processes used in the microelectronics industry. If the waveguides consist of a semiconductor material, such as silicon, having a high refractive constant, the coupling distance will be small (less than 1 micron). If the waveguides consist of a glass or polymer material having a low index of refraction the coupling distance can be greater than 1 micron. This configuration is favorable for devices using low index waveguides because of the ease of fabricating the relatively larger coupling distance using lithographic processes.

A ring resonant cavity selectively tunes to a desired wavelength that is dropped, based upon the refractive index change of the ring itself. A single or multiple ring or disk shaped planar element(s) can be used as an efficient filter when evanescently coupled to an input waveguide and opposite to an output or drop port. When the wavelength of interest is resonant with the ring or disk, that wavelength traverses the resonator to the drop port. However when the disk/ring is not in resonance with the wavelength of interest, the light simply bypasses the resonant cavity and is transmitted to the through port. Therefore, in a DWDM system which carries multiple wavelengths, a single wavelength can be dropped from the stream of multiple wavelengths based on the refractive index of the ring.

For a single ring, the resonant wavelength is given by the following formula:

$$\lambda_0 = \frac{2\pi R n_e}{M},$$

where R is the ring radius, $n_e$ is the effective index of refraction of the mode in the ring waveguide, M is an integer value, and $\lambda_0$ is the resonant wavelength. The separation between the ring and the input waveguide, and between the ring and the output waveguide, determines the degree of interaction between the modes traveling along the waveguides and the ring resonator mode. The magnitude of this interaction, called the coupling coefficient ($\kappa^2$), is an important device parameter that governs the optical bandwidth of the resonator. $\kappa^2$ is determined by the overlap of the electric field of the input or output waveguide with the ring resonator. Thus the coupling coefficient decreases as the separation distance between the waveguides and ring is increased. Additionally, waveguides that have a high index contrast between the core and cladding have very little of the electric field extending into the cladding material. Therefore, for a given separation distance a material with a high core refractive index will have a lower coupling constant than a comparable material with a lower refractive index.

The optical bandwidth is in the range of wavelengths that are allowed to pass unattenuated from the input waveguide to the output waveguide via the ring. The switching or modulation efficiency is the ratio of the change in optical intensity at the output, to a change in absorption induced in the ring waveguide. The interaction is explicitly calculated as the fraction of power coupled from the input waveguide to the ring, over the associated mutual interaction regions. This fraction of power is denoted by $\kappa^2$, and the resulting optical bandwidth, denoted by $\Delta\lambda$, is given by the formula, $$\Delta\lambda = \frac{\kappa^2 \lambda_0^2}{2\pi^2 R n_e}.$$

It will be appreciated that the degree of interaction between the output waveguide and the ring must also be chosen to be equal to that between the input waveguide and ring, that is also $\kappa^2$.

Ring resonator 105 itself consists of a disk or ring shaped dielectric of material having a higher refractive index than the cladding material surrounding it. The material comprising the resonator can be made from a saturable absorber material including quantum dot doped glasses or polymers, or multiple quantum wells, or a saturable bulk semiconductor. The saturable absorber materials are highly absorbing under low intensity illumination and become less absorbing upon increased incident light intensity. Due to the Kramers-Kronig relationship described above, as the absorption coefficient of the saturable absorber material decreases so too does the refractive index (or increases depending on which side of the absorption peak is being observed). Thus, illuminating the saturable absorber material with a high intensity light beam can change the resonant condition of the ring resonator. Because the wavelength that is dropped is directly proportional to the effective index of refraction, a 2% change in refractive index can alter the resonant wavelength over 30 nm in the 1550 nm wavelength region, thus covering the entire band that is used in DWDM systems.

Figure 12:
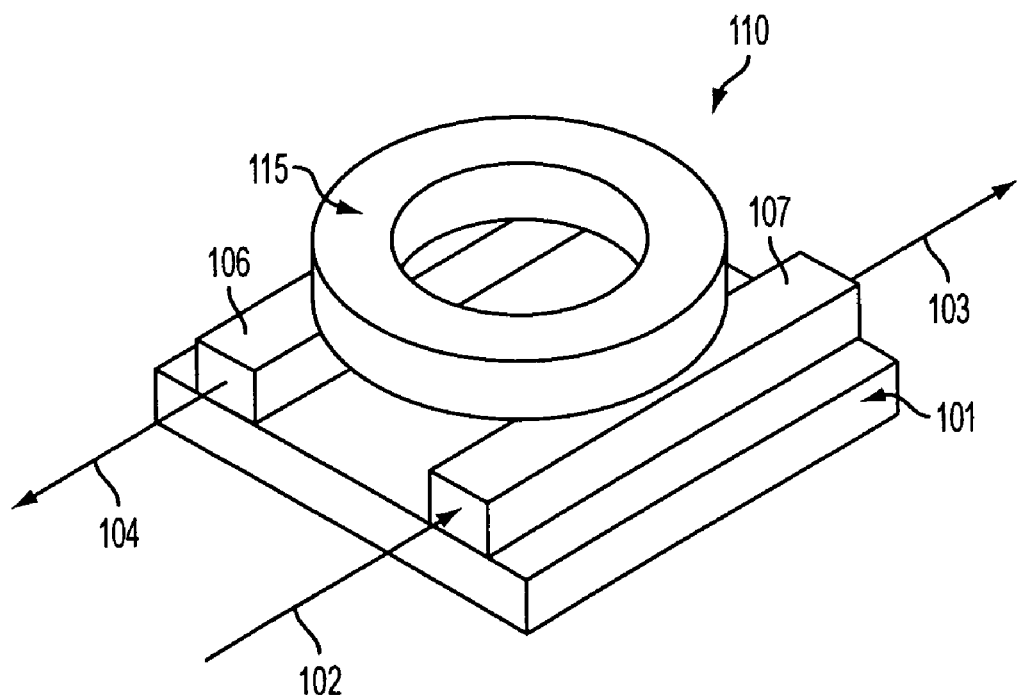
FIG. 12 is a ring resonator filter in accordance of another embodiment of the present invention.

FIG. 12 is a ring resonator filter 110 in accordance of another embodiment of the present invention. In filter 110, a thin film is grown on top of the input-port/through-port waveguide 107 and drop-port waveguide 106. A ring resonator 115 is then fabricated on top of the thin film. The thin film serves as a spacer and thus controls the coupling coefficient of filter 110. As in filter 100, both high refractive index semiconductor waveguides or low refractive index glass or plastic waveguides can be used. For 65 semiconductor waveguides the film must be thinner than when using low refractive index waveguides. If high refractive index waveguides are used the thin film layer will have a thickness of under 1 micron while low refractive index waveguides will require a film thicker than 1 micron.

In both filters 100 and 110, a high intensity control beam determines the refractive index of the ring resonator and thus the wavelength that will be dropped from a multiple wavelength DWDM stream. The control beam can either illuminate the ring from above or can couple to the ring via the input, through, or drop ports. In the former case, the ring can be sandwiched between mirrors and thus increase the optical control power within the ring and subsequently cause a greater refractive index change. In the latter case, the Q of the cavity increases the optical control power within the ring. In this situation however, the control beam propagation direction is opposite to that of either the drop port wavelengths or the input/through port wavelengths. If the control beam has the same wavelengths as any in the drop port or input/through ports an isolator can be used to separate the dropped wavelengths (or those transmitted to the through port) from the control beam itself.

All inputs and outputs of filters 100 and 110 are in the form of optical dielectric waveguides consisting of transparent glass, polymer, or semiconductor materials transparent to the wavelength which the device is operating at (i.e., the semiconductor bandgap is greater than the energy of the operation wavelength photon energies). The waveguides may be in the form of integrated ridge or buried type waveguides or integrated waveguides based upon photonic crystals. In the former two cases (ridge or buried waveguides) the guiding conditions dictate that the waveguide material have a higher dielectric constant (i.e., higher index of refraction n) than the cladding material index. In the case of an out-of-plane control beam the waveguide may be of the form of an optical fiber. The cross sectional areas of the waveguide must be of the size to support a single mode at the operational wavelength. Typical dimensions are between 0.5 micron and 10 microns in diameter depending on the waveguide material and operational wavelength. The signal input waveguide must have the same cross sectional dimensions as the signal output waveguide.

If the input and output waveguides are integrated on a substrate they may in turn be coupled to optical fiber or to the input/output waveguides of another integrated switching.

The filters described above may be used to form a switching DWDM demultiplexor. Using arrays of reconfigurable optical add/drop filters (which can be fabricated on the same substrate in the case of the planar architecture) it is possible to demultiplex (or multiplex) a DWDM multiwavelength stream and drop each wavelength channel to specified output ports. For example, an optical fiber carrying multiple data streams on ten different wavelength channels is separated into ten different output fibers (each carrying only one wavelength channel) where any of the one input wavelength channels can be dropped to any one of the ten output fibers. Thus, the switchable DWDM demultiplexor incorporates features of both an all-optical demultiplexor (such as an AWG) and an all-optical switch matrix (such as MEMS devices).

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An optical filer comprising:
   a resonator cavity comprising a saturable absorber material;
   an input signal waveguide coupled to said cavity;
   a non-resonant wavelengths output waveguide coupled to said cavity; and
   a resonant wavelength output waveguide coupled to said cavity, wherein said resonator cavity further comprises quantum dots, said resonator cavity comprises a ring resonator, said resonator cavity further comprises quantum dots, said input signal waveguide and said non-resonant wavelengths waveguide are a first waveguide, said resonator cavity is coupled between said first waveguide and said resonant wavelength output waveguide, and said ring resonator cavity is evanescently coupled to said first waveguide and said resonant wavelength output waveguide.

2. The optical filter of claim 1, wherein said resonator cavity comprises:
   a quantum dot doped saturable absorber thin film; and
   a first and second planar mirror coupled to said thin film.

3. The optical filter of claim 1, further comprising a control beam waveguide coupled to said resonator cavity.

4. The optical filter of claim 1, further comprising a circulator coupled to said resonator cavity.

5. The optical filter of claim 1, wherein said resonator cavity is a Fabry-Perot vertical stack.

6. The optical filter of claim 5, wherein said vertical stack has a front surface, and said input signal waveguide is perpendicular to said front surface.

7. The optical filter of claim 5, wherein said vertical stack has a front surface, and said input signal waveguide is not perpendicular to said front surface.

8. The optical filter of claim 1, wherein said quantum dots comprise Lead Sulfide.

9. The optical filter of claim 1, wherein said quantum dots comprise cladding.

10. The optical filter of claim 1, wherein said quantum dots are manufactured using a colloidal growth process.

11. The optical filter of claim 1, further comprising distributed Bragg mirrors.

12. The optical filter of claim 1, wherein said input signal waveguide, non-resonant wavelengths output waveguide, and resonant wavelength output waveguide comprise optical fibers.

13. The optical filter of claim 1, further comprising a substrate, wherein said input signal waveguide, non-resonant wavelengths output waveguide, and resonant wavelength output waveguide are integrated on said substrate.

14. The optical filter of claim 1, wherein said resonator cavity comprises a ring resonator.

15. The optical filter of claim 1, wherein said input signal waveguide and said non-resonant wavelengths waveguide are a first waveguide, and wherein said resonator cavity is coupled on top of said first waveguide and said resonant wavelength output waveguide.

* * * * *